United States Patent [19]

Ragusa et al.

[11] Patent Number: 4,859,822
[45] Date of Patent: Aug. 22, 1989

[54] MICROWAVEABLE CONTAINER

[75] Inventors: James J. Ragusa; Gordon V. Sharps, Jr., both of Fairport, N.Y.

[73] Assignee: Mobil Oil Corporation, New York, N.Y.

[21] Appl. No.: 195,916

[22] Filed: May 19, 1988

[51] Int. Cl.$^4$ .......................... H05B 6/64; A23C 3/07
[52] U.S. Cl. ...................... 219/10.55 E; 99/DIG. 14; 426/243; 206/515; 206/518; 206/557; 229/903; 220/DIG. 13
[58] Field of Search ................. 219/10.55 R, 10.55 E, 219/10.55 F; 99/DIG. 14; 426/107, 237, 241, 243; 206/515, 518, 557; 229/903, 2.5 R; 220/306, DIG. 13

[56] References Cited

U.S. PATENT DOCUMENTS

| | | | |
|---|---|---|---|
| 3,469,764 | 9/1969 | Gaylor, Jr. | 229/44 |
| 3,938,727 | 2/1976 | Andersson | 229/2.5 R |
| 4,120,398 | 10/1978 | Braddon, Sr. | 206/408 |
| 4,150,777 | 4/1979 | Cyr et al. | 229/2.5 R |
| 4,416,906 | 11/1983 | Watkins | 426/107 |
| 4,477,705 | 10/1984 | Danley et al. | 219/10.55 E |
| 4,486,640 | 12/1984 | Bowen et al. | 219/10.55 E |
| 4,558,198 | 12/1985 | Levendusky et al. | 219/10.55 E |
| 4,560,850 | 12/1985 | Levendusky et al. | 219/10.55 E |
| 4,640,838 | 2/1987 | Isakson et al. | 426/107 |
| 4,641,005 | 2/1987 | Seiferth | 219/10.55 E |
| 4,704,510 | 11/1987 | Matsui | 219/10.55 E |

Primary Examiner—A. D. Pellinen
Assistant Examiner—David Osborn
Attorney, Agent, or Firm—Alexander J. McKillop; Charles J. Speciale

[57] ABSTRACT

A container constituted of a microwave transparent material for the heating or cooking of foods or comestibles through the intermediary of microwaves at a high degree of efficiency and with an enhanced temperature uniformity. The container base is configured in a manner to produce generally wavilinear or undulating bottom wall and side wall configurations which will disperse the food or comestible within the container to an optimum extent so as to increase the heating and cooking efficiency thereof, and to provide a more uniform temperature distribution throughout the container contents, thereby enabling the rapid and even heating and-/or cooking of the food by microwave energy. The container may include a closure lid, essentially consisting of a domed structure incorporating a vent or oneway release valve for steam generated within the container during microwave cooking, and which is mountable on the container base such as to provide an essentially sealed container structure during the microwave heating and/or cooking of the food in the container.

9 Claims, 2 Drawing Sheets

MICROWAVEABLE CONTAINER

BACKGROUND OF THE INVENTION

1. Field of the Invention

The present invention relates to a microwaveable container and, more particularly, relates to a container constituted of a microwave transparent material for the heating or cooking of foods or comestibles through the intermediary of microwaves at a high degree of efficiency and with an enhanced temperature uniformity.

In recent years, the heating and cooking of foods through the utilization of microwaves has immensely gained in popularity with homemakers in view of the simplicity and rapidity in the preparation and cooking of various kinds of foods in this manner. Generally, the folds, which may be in a frozen state or at ambient temperature. are heated or cooked in suitable containers, which may be reuseable in nature, i.e. Pyrex (registered trademark) or other non-metallic cookware, or disposable, such as foamed plastic material or the like. Such containers are formed from a material which is transparent to microwaves to enable the foods within the container to be railed to suitable heating or cooking temperature in the absence of any undue heating of the container itself, tending to possibly cause distortions adversely affecting the integrity of the container. Furthermore, during the heating or cooking of the foods in the container through microwaves, the heating of the foods is frequently generally irregular or uneven in nature; in essence, various locations within the container are raised to higher or non-uniform temperatures, causing the formation of so-called "hot spots", thereby resulting in an uneven heating or cooking of the foods and adversely affecting the taste and appearance thereof to a consumer.

In order to attain a high degree of efficiency and temperature uniformity in cooking the foods in containers through the intermediary of microwaves, various steps have been undertaken in the development of microwaveable containers in order to solve the encountered problems. Among these solutions are the use of laminated or complex types of materials for the containers, such as special susceptor materials which will improve upon the microwave efficiency. Furthermore, in order to further ameliorate problems encountered in the nonuniform heating or cooking of foods in containers which are constituted from microwave transparent materials, consideration has been given in the technology towards suitable configuring of the containers, such as raising at least portions of the bottom surfaces thereof such as to distribute the contents of the container in a more optimum or expedient manner, and to thereby obtain a greater degree of temperature uniformity during the microwave heating or cooking process. Although the various measures which have been undertaken in the technology in order to improve upon efficiency and temperature uniformity during microwave cooking of various comestibles, these still have not proven to be entirely adequate; necessitating, either the employment of expensive materials or container constructions, or configuring microwave-transparent containers in a manner which has still proven to be somewhat elusive in providing the required degree of temperature uniformity during the cooking of the foods.

2. Discussion of the Prior Art

Thus, Matsui U.S. Pat. No. 4,704,510 discloses a container for food service which is adapted to withstand heating in a microwave oven, wherein the container is formed from a laminate sheet material consisting of a non-stretched polyethylene terephthalate film laminated to the interior of a foamed plastic sheet. Moreover, the bottom of the container is raised or curved concavely towards the center thereof in order to distribute the container contents and thereby improve upon the heat distribution within the container during the heating or cooking of the contents with microwaves. However, the laminated container material employed herein is of a complex and resultingly expensive construction.

Bowen, et al. U.S. Pat. No. 4,486,640 pertains to a utensil for cooking and/or baking foods in a microwave oven in which a generally flat bottomed container base incorporates a removable tray and a closure lid possessing apertures to enable the escape of steam which is generated during cooking. This microwaveable container structure is relatively complex and expensive, while it does not enable the optimum distribution of foods or comestibles within the container to allow for a more uniform temperature distribution therethrough during cooking with microwave energy.

Watkins U.S. Pat. 4,416,906 discloses a microwave food heating container having a central raised core in the container bottom to essentially distribute the food contained therein about an annulus to improve upon the uniform heating thereof. As in the other above-mentioned patents, there is no optimum distribution of the food within the container so as to allow for a greater efficiency during cooking and a degree in the uniformity of the temperature which will meet the demands of the technology for cooking with microwave energy.

Isakson, et al. U.S. Pat. No. 4,640,838 describes a vapor-tight microwave oven package incorporating a vent enabling the escape of steam or vapor which is generated during cooking, and does not provide for an optimum distribution of foods within a generally rigid microwaveable container to attain uniform temperatures during microwave cooking or heating of the food contents of a container.

Levendusky, et al. U.S. Pat. No. 4,560,850 discloses a microwave container with a cover incorporating a port for the release of steam, and with a raised container bottom to distribute the foods therein for more even cooking or heating. This structure also fails to provide for the optimum dispersion of a food within a specially configured container and does not allow for an adequately uniform temperature distribution through the food as it is cooked by microwave energy with a resultant higher degree of efficiency.

SUMMARY OF THE INVENTION

In order to ameliorate or obviate the shortcomings and limitations encountered in prior art microwaveable containers which are adapted for the heating and/or cooking of foods in a microwave oven, the present invention is directed to the provision of a simple and inexpensive container structure which is constituted of a microwave transparent material, wherein the container base is configured in a manner to produce generally wavilinear or undulating bottom wall and side wall configurations, with the lower end of the side wall including a curvilinear transition wall surface joining the side wall with the bottom wall, which will disperse the food or comestible within the container to an optimum extent so as to increase the heating and cooking efficiency thereof, and to provide a more uniform temperature distribution throughout the container contents, thereby enabling the rapid and even heating and/or cooking of the food by microwave energy.

Moreover, pursuant to another aspect of the invention, the container contemplates the provision of a novel closure lid, essentially consisting of a domed structure incorporating a vent or one-way release valve for steam generated within the container during microwave cooking, and which is mountable on the container base such as to provide an essentially sealed container structure during the microwave heating and/or cooking of the food in the container, enhancing the uniformity of temperature throughout the contents of the container.

Pursuant to the foregoing concept, the inventive microwaveable container may be constituted of simple materials which are inexpensive and are essentially microwave transparent; for instance, foamed thermoplastic materials, so as to enable the container to be employed as a disposable, so-called "single-use" container.

Accordingly, it is a primary object of the present invention to provide a microwaveable container possessing a novel configuration enabling an optimum distribution or dispersion of foods contained therein so as to achieve a high degree of efficiency and temperature uniformity during the heating and/or cooking of the contents of the container with microwave energy.

Another object of the invention resides in the provision of a uniquely configured container with a superimposable domed lid structure which will afford a generally sealed environment for the uniform cooking and/or heating the contents of the container with microwave energy.

Yet another object of the invention is to provide a container of the type described herein, in which the domed lid structure for the container incorporates a vent or one-way value device facilitating the release of steam from the container which is generated during the cooking of the container contents.

BRIEF DESCRIPTION OF THE DRAWINGS

The foregoing and other objects and advantages of the invention may now be more readily ascertained from the following detailed description of an exemplary embodiment of the microwaveable container, taken in conjunction with the accompanying drawings; in which.

DETAILED DESCRIPTION

Figure 1:
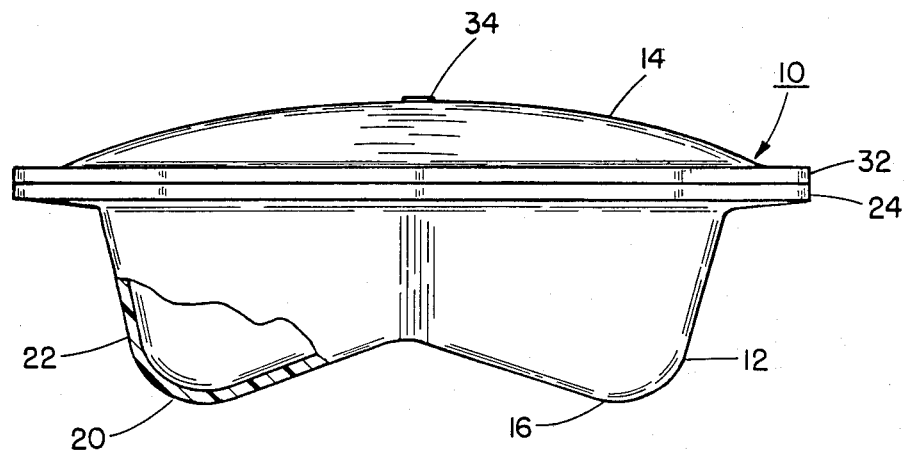
FIG. 1 illustrates a side elevational view, partly in section, of a microwaveable container pursuant to the present invention.

Referring now in more specific detail to the drawings, FIG. 1 illustrates a microwaveable container 10 which is constructed pursuant to the present invention. In essence, the container includes a generally bowl-shaped base 12 which, when desired, is adapted to be sealingly closed by a cover 14 during the heating and/or cooking of foods or comestibles by means of microwave energy in a suitable microwave oven (not shown).

In essence, the container base 12 and the cover 14 may each be constituted of any kind of suitable heat-resistant material which is substantially transparent to microwaves, while concurrently being liquid-impervious, such as foamed polystyrene or the like, and in which the container base 12 and the cover 14 may suitably and inexpensively be produced through the intermediary of thermoforming or the like, as is well-known in the plastics molding technology.

Figure 2:
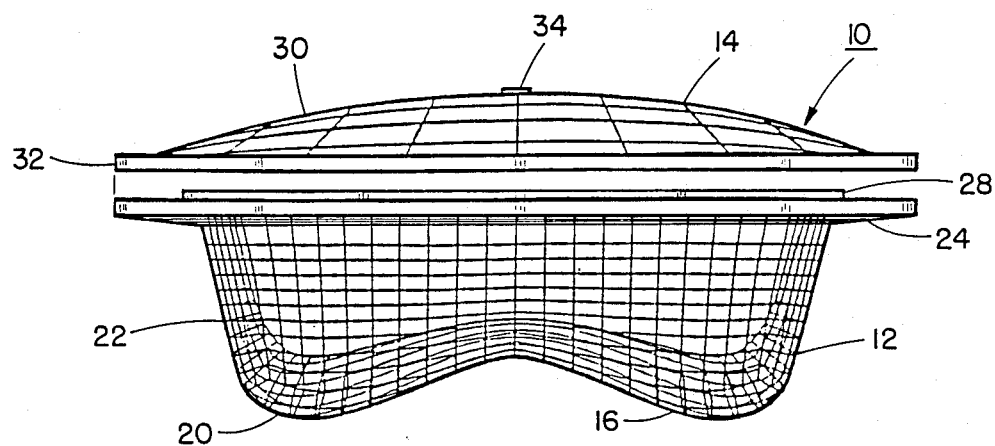
FIG. 2 illustrates a graphically plotted representation of the container, shown in an open condition, representative of the configuration thereof for an optimum distribution of the contents.
Figure 3:
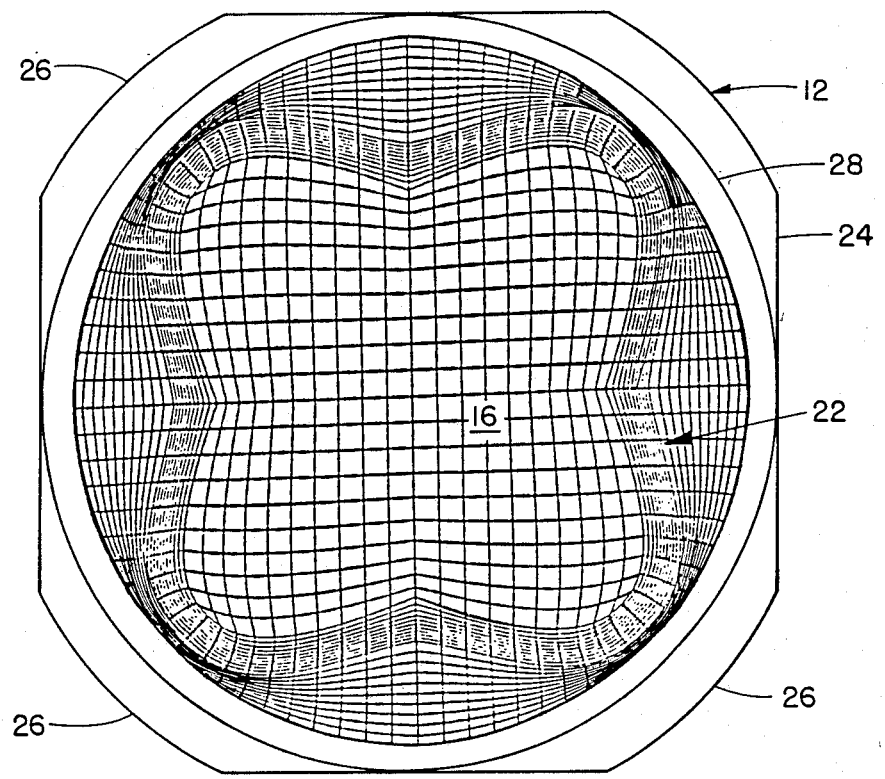
FIG. 3 illustrates a plan view along the direction of line 3—3 in FIG. 2 showing the undulating configuration of the side walls.
Figure 4:
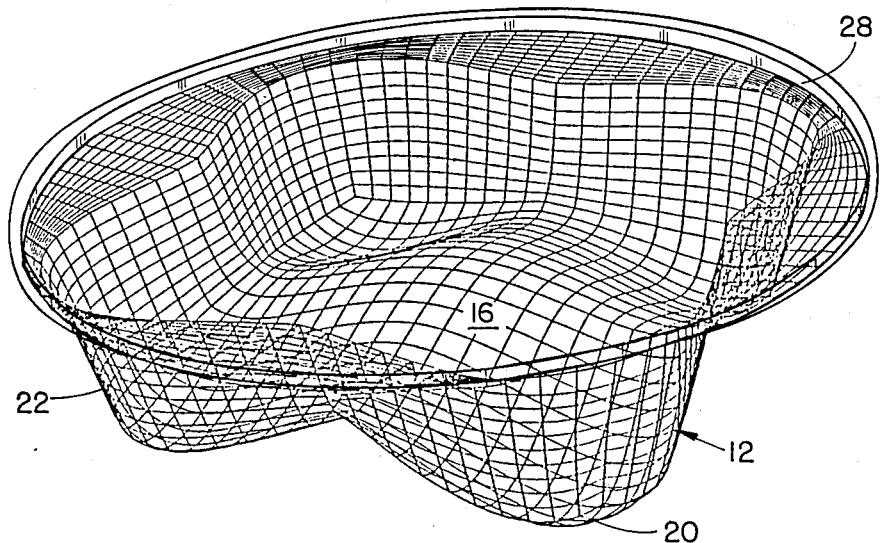
FIG. 4 illustrates a graphically plotted representation of the container bottom portion in a perspective view, showing the undulating configuration of the side of bottom wall container structure.

The container base or bowl portion 12, as shown generally graphically in FIGS. 2 and 3 of the drawings, essentially consists of a bottom wall structure 16 possessing a generally undulating configuration, in essence, having a peripheral wavilinear or undulating shape, as is clearly illustrated in the perspective view of FIG. 4, and in which the center of the bottom 16 is raised relative to the circumferential bottom edge 20 on which the container base 12 is adapted to be supported on a flat surface, such as in a microwave oven.

The upwardly extending peripheral side wall 22 of the container base 12, which is also radially outwardly sloped or inclined towards the upper end thereof, is connected with the bottom edge 20 through a rounded perimeter base portion 24 which provides a smooth fairing or essentially a curvilinear transition wall surface between peripheral edge 20 of the bottom 16 and the peripheral side wall 22 such as to, in essence, elevate the container base in order to improve upon the uniform heating to cooking of the container contents and to concurrently prevent the formation of so-called "hot spots" or localized regions of elevated temperature tending to unevenly cook or heat the contents or food in the container which will adversely affect the taste and appearance of the food.

As may be clearly ascertained from FIGS. 3 and 4, the peripheral side wall 22 of the container base 12 is of an undulating configuration generally representing, in plan view, a cloverleaf pattern or shape, which will improve upon the heating efficiency and uniform temperature distribution within the container during microwave heating or cooking of the foods in the container.

The upper edge or rim of the undulating peripheral side wall 22 extends into a generally preferably rectangular or square flange 24, which may have rounded corners 26, and which projects horizontally outwardly from the upper rim of the container side wall 22 so as to enhance the rigidity and strength of the container; in effect, its resistance to bending and distortion, to enable handling thereof without deforming the container, and to allow for an improved storage and orientation when the container is intended to be packaged in a carton or the like for wholesale and retail display or shipping.

Extending upwardly from the generally rectangular flange 24 is a circular flange portion 28, formed integrally therewith about the upper opening of the container base 12, and which is adapted to be introduced into a suitable complementary circular recess provided in the cover 14 for mating engagement therewith, and which will facilitate the sealing mounting of the cover 14 on the container base 12 without the need for having to ascertain the correct angular orientation therebetween.

Preferably, the cover 14 is a generally domeshaped lid structure which, as previously indicated, may also be constituted of a heat-resistant material which is transparent to microwaves, such as foamed polystyrene, and which includes about the bottom edge of the dome 30, an integral peripheral flange 32 having a recess therein (not shown) adapted to matingly receive and engage the raised circular portion 28 on the flange 26 of the container base 12 so as to, when the container is to be closed, provide a sealed container structure 10. Moreover, the provision of the peripheral flange 32 on the domed lid structure, which flange is also rectangular and coextensive with flange 24, in cooperation with the flange 24 on the container base 12 imparts a further increase in the strength in the container construction during handling thereof, while concurrently increasing the rigidity and strength of the dome-shaped lid structure.

The upper end of the dome-shaped lid structure 14 may be provided with a suitable vent 34, which may be a one-way valve to permit the venting or release of steam or vapor which is generated during the heating and/or cooking of the food in the container by microwave energy.

The foregoing unique cloverleaf design or shape of the bottom wall and side wall of the container base 12 allows for an optimum distribution or dispersion of the foods contained therein, and will considerably increase the efficiency and temperature uniformity within the container during microwave heating or cooking of the contents in a microwave oven without, in any manner, adversely affecting the integrity or strength of the container.

Furthermore, the undulating configuration of the bottom wall 16 of the container base 12, and the raised center thereof relative to the bottom of the microwave oven or support surface further increases the efficiency in the heating or cooking of the container contents by causing the microwaves to be evenly distributed throughout the food, thereby eliminating temperature and heating non-uniformities.

From the foregoing, it becomes readily apparent that due to the unique shape of the container there is attained a considerable increase in the uniformity and efficiency in the microwave heating of foods, without the necessity of having to provide special materials for the microwaveable container, inasmuch as any inexpensive material which is substantially transparent to microwaves can be readily employed in achieving the desirable results pursuant to the invention, thereby rendering the container expendable even after a single use.

While there has been shown and described what is considered to be a preferred embodiment of the invention, it will of course be understood that various modifications and changes in form or detail could readily be made without departing from the spirit of the invention. It is therefore intended that the invention be not limited to the exact form and detail herein shown and described, nor to anything less than the whole of the invention herein disclosed as hereinafter claimed.

What is claimed is:

1. A container constituted of a microwave-transparent material for the heating or cooking of foods, said container including a bottom wall having a contoured wavilinear peripheral configuration and a raised center portion; a peripheral upstanding side wall structure having an undulating contour; a curvilinear transition wall surface joining said bottom wall structure with the lower end of said side wall structure, the container bottom wall and side wall configurations enabling the distribution of the foods within said container so as to enhance the degree of uniformity in the heating or cooking of said foods in said container by microwave energy; and a radially outwardly projecting peripheral flange extending from the upper edge of said peripheral side wall structure so as to impart stability to said container during storage and enhance the strength of said container during handling and lifting thereof, said flange including a raised flange portion extending about the opening of said container adapted to sealingly engage a complementary flange structure on a cover for said container.

2. A container as claimed in claim 1, wherein wavilinear peripheral configuration of said bottom wall is of a generally undulating shape.

3. A container as claimed in claim 1, wherein said undulating side wall structure essentially defines a cloverleaf contour in plan view.

4. A container as claimed in claim 1, wherein said peripheral flange has a generally rectangular configuration.

5. A container as claimed in claim 1, wherein said curvilinear transition wall surface comprises a rounded base connecting the circumference of said bottom wall with the lower end of said side wall structure so as to enhance the heating or cooking of the foods in said container while concurrently inhibiting the formation of hot spots adversely affecting the degree of uniformity of said heating or cooking 6. A container as claimed in claim 1, wherein said container cover comprises a domed lid member having a peripheral radially projecting flange; and recess means in said flange for sealingly engaging th raised flange portion on said container upon superposition of said lid member on said container to form a sealed container arrangement.

7. A container as claimed in claim 6, wherein said flange on said domed lid member is substantially coextensive with the flange on said container.

8. A container as claimed in claim 6, wherein said domed lid member includes venting means for the release of steam from the interior of said container arrangement during the heating or cooking of said comestibles.

9. A container as claimed in claim 8, wherein said venting means comprises a one-way valve arranged in the domed portion of said lid member.

* * * * *